US008655569B2

(12) United States Patent
Choby

(10) Patent No.: US 8,655,569 B2
(45) Date of Patent: Feb. 18, 2014

(54) METHOD AND SYSTEM FOR VARYING AN OUTPUT OF A DRIVEFORCE UNIT BASED ON LOAD DATA

(75) Inventor: Jordan Choby, Huntington Beach, CA (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 818 days.

(21) Appl. No.: 12/716,120

(22) Filed: Mar. 2, 2010

(65) Prior Publication Data

US 2011/0218725 A1 Sep. 8, 2011

(51) Int. Cl.
*B60K 17/35* (2006.01)
*G06F 19/00* (2011.01)

(52) U.S. Cl.
USPC ................................ 701/99; 701/70; 180/197

(58) Field of Classification Search
USPC ............... 701/99, 70, 36, 48, 73; 477/107, 98
See application file for complete search history.

(56) References Cited

U.S. PATENT DOCUMENTS 3,665,779 A 5/1972 Mori
4,164,876 A 8/1979 Peppel
4,254,998 A 3/1981 Marshall et al.
4,592,565 A 6/1986 Eagle
4,598,611 A 7/1986 Frank
4,601,680 A 7/1986 Tokoro et al.
4,841,815 A 6/1989 Takahashi
4,884,648 A 12/1989 Uchida et al.
4,958,695 A 9/1990 Uchida et al.
5,099,720 A 3/1992 Raue
5,233,523 A 8/1993 Follmer
5,413,541 A 5/1995 Nasset
5,444,307 A 8/1995 Sheets et al.
5,459,658 A 10/1995 Morey et al.
5,612,873 A * 3/1997 Ogawa ............................ 701/51
5,629,852 A * 5/1997 Yokoyama et al. ........... 701/101
5,717,592 A 2/1998 Oo et al.
5,857,937 A 1/1999 Ashizawa et al.

(Continued)

FOREIGN PATENT DOCUMENTS

EP 425276 10/1990
JP 2-71163 5/1990

(Continued)

OTHER PUBLICATIONS

RD 323100.

*Primary Examiner* — Tan Q Nguyen
(74) *Attorney, Agent, or Firm* — Snell & Wilmer LLP

(57) ABSTRACT

A method and system for varying an output of a driveforce unit based on load data. The present invention includes an automobile including a driveforce system. The driveforce system includes a driveforce unit for generating an output according to a driveforce map, a memory for storing the driveforce map, a load determination unit for determining a load data indicating a load on the automobile, a speed sensor for detecting speed data indicating a speed of the automobile and/or an acceleration of the automobile, an acceleration input device for detecting acceleration input data indicating a percent application of the acceleration input device, and a processor. The processor receives the acceleration input data, the speed data, and the load data, and adjusts a driveforce curve in the driveforce map to maintain a speed of the automobile, even when the load data indicates an increased or decreased load on the automobile.

19 Claims, 4 Drawing Sheets

(56) References Cited

U.S. PATENT DOCUMENTS

| | | | |
|---|---|---|---|
| 5,913,916 | A | 6/1999 | Bai et al. |
| 5,957,255 | A | 9/1999 | Grytzelius |
| 6,042,196 | A | 3/2000 | Nakamura et al. |
| 6,067,493 | A | 5/2000 | Adachi et al. |
| 6,076,622 | A | 6/2000 | Chakraborty |
| 6,128,565 | A | 10/2000 | Tsutsui et al. |
| 6,188,943 | B1 * | 2/2001 | Uchida et al. .................. 701/54 |
| 6,205,387 | B1 | 3/2001 | Ochiai |
| 6,299,263 | B1 * | 10/2001 | Uematsu et al. .............. 303/192 |
| 6,440,037 | B2 | 8/2002 | Takagi et al. |
| 6,442,467 | B1 | 8/2002 | Schuler et al. |
| 6,461,261 | B2 | 10/2002 | Yamamoto et al. |
| 6,466,851 | B2 | 10/2002 | Kato et al. |
| 6,478,713 | B1 | 11/2002 | Runde et al. |
| 6,496,771 | B2 | 12/2002 | Hattori et al. |
| 6,516,260 | B2 | 2/2003 | Wetzel et al. |
| 6,516,664 | B2 | 2/2003 | Lynam |
| 6,523,911 | B1 | 2/2003 | Rupp et al. |
| 6,524,216 | B2 | 2/2003 | Suzuki et al. |
| 6,584,391 | B2 | 6/2003 | Lack |
| 6,620,076 | B1 * | 9/2003 | Kawamura et al. ........... 477/107 |
| 6,662,098 | B2 | 12/2003 | Hellmann et al. |
| 6,668,225 | B2 | 12/2003 | Oh et al. |
| 6,726,594 | B2 | 4/2004 | Mizuno et al. |
| 6,821,228 | B2 | 11/2004 | Aoki et al. |
| 6,823,250 | B2 | 11/2004 | Yamaguchi et al. |
| 6,957,139 | B2 | 10/2005 | Bellinger |
| 6,968,736 | B2 | 11/2005 | Lynam |
| 6,995,663 | B2 | 2/2006 | Geisler et al. |
| 7,113,860 | B2 | 9/2006 | Wang |
| 7,139,650 | B2 | 11/2006 | Lubischer |
| 7,177,743 | B2 | 2/2007 | Roy |
| 7,226,134 | B2 | 6/2007 | Horn et al. |
| 7,272,481 | B2 | 9/2007 | Einig et al. |
| 7,302,332 | B2 | 11/2007 | Nenninger |
| 7,303,505 | B2 | 12/2007 | Kanafani et al. |
| 7,349,776 | B2 * | 3/2008 | Spillane et al. ................. 701/36 |
| 7,392,120 | B2 | 6/2008 | Matsumoto et al. |
| 7,393,305 | B2 | 7/2008 | Yamada et al. |
| 7,447,583 | B2 | 11/2008 | Ogawa |
| 7,548,810 | B2 | 6/2009 | Aoki |
| 7,568,996 | B2 | 8/2009 | Matsui et al. |
| 7,582,041 | B2 | 9/2009 | Suzuki et al. |
| 2005/0049772 | A1 | 3/2005 | Liu |
| 2005/0051133 | A1 | 3/2005 | Persson et al. |
| 2005/0065693 | A1 * | 3/2005 | Wang et al. ..................... 701/70 |
| 2005/0284679 | A1 * | 12/2005 | Hommi et al. ................ 180/197 |
| 2006/0041355 | A1 | 2/2006 | Blundell et al. |
| 2006/0261980 | A1 | 11/2006 | Beier |
| 2007/0260385 | A1 | 11/2007 | Tandy, Jr. et al. |
| 2007/0266700 | A1 | 11/2007 | Lang et al. |
| 2008/0027613 | A1 | 1/2008 | Bai et al. |
| 2008/0032858 | A1 | 2/2008 | Frank et al. |
| 2008/0036296 | A1 | 2/2008 | Wu et al. |
| 2008/0147277 | A1 | 6/2008 | Lu et al. |
| 2008/0172163 | A1 | 7/2008 | Englert et al. |
| 2008/0312030 | A1 | 12/2008 | Kurita et al. |
| 2009/0018736 | A1 | 1/2009 | Kuwahara |
| 2009/0043468 | A1 | 2/2009 | Kondo et al. |
| 2009/0072997 | A1 | 3/2009 | Shrum, Jr. |
| 2009/0088938 | A1 | 4/2009 | Usukura |
| 2009/0093936 | A1 | 4/2009 | Lindgren et al. |
| 2009/0118095 | A1 | 5/2009 | Tabata et al. |
| 2009/0157269 | A1 | 6/2009 | Matsubara et al. |
| 2009/0219394 | A1 | 9/2009 | Heslin |
| 2009/0236159 | A1 | 9/2009 | Shibata et al. |
| 2009/0240405 | A1 | 9/2009 | Tawara |
| 2009/0250278 | A1 | 10/2009 | Kawasaki et al. |
| 2011/0112743 | A1 * | 5/2011 | Ahn .............................. 701/103 |

FOREIGN PATENT DOCUMENTS

| | | |
|---|---|---|
| JP | 06-270713 | 9/1994 |
| JP | 09-042444 | 2/1997 |
| JP | 2000-043705 | 2/2000 |
| JP | 2000-272381 | 10/2000 |
| JP | 2001088683 | 4/2001 |
| JP | 2001-235016 | 8/2001 |

* cited by examiner

METHOD AND SYSTEM FOR VARYING AN OUTPUT OF A DRIVEFORCE UNIT BASED ON LOAD DATA

BACKGROUND

1. Field

The present invention relates to a method and system for varying an output of a driveforce unit based on load data.

2. Description of the Related Art

Conventional automobiles generate an output for a driveforce unit corresponding only to an application of an acceleration input device. This is undesirable in certain situations, such as when there is an increased load on the automobile and especially when an amount of load on the automobile is dynamic. The increased load requires the user to increase application of the acceleration input device in order to increase the output of the driveforce unit and maintain the automobile at a substantially constant speed. In addition, if the load on the automobile is dynamic, the user will have to constantly increase or decrease application of the acceleration input device in order to maintain the automobile at a substantially constant speed. This can be tiresome and inconvenient for the user.

Thus, there is a need for a method and system for varying an output of a driveforce unit based on load data.

SUMMARY

The present invention is directed to a method and system for varying an output of a driveforce unit based on load data. In one embodiment, the present invention includes an automobile including a driveforce system. The driveforce system can include a driveforce unit, a memory for storing a driveforce map, a load determination unit, a speed sensor, an acceleration input device, and a processor.

The acceleration input device can detect acceleration input data indicating a percent application of the acceleration input device. The load determination unit can determine a load data indicating a load on the automobile. The speed sensor can detect speed data indicating a speed of the automobile and/or an acceleration of the automobile. The driveforce unit can generate an output according to the driveforce map.

The processor can receive the acceleration input data, the speed data, and the load data, and adjust a driveforce curve in the driveforce map to maintain a speed of the automobile such that the user does not need to increase or decrease application of the acceleration input device, even when the load data indicates an increased or decreased load on the automobile. This reduces the likelihood that the user has to constantly increase or decrease application of the acceleration input device, even when the load on the automobile increases or decreases.

In one embodiment, the driveforce curve is increased only when the load data indicates a load above a first predetermined load threshold. In another embodiment, the driveforce curve is decreased only when the load data indicates a load below a second predetermined load threshold. This can reduce an amount of changes to the driveforce curve and subsequently the output of the driveforce unit.

In one embodiment, the present invention is a driveforce system including a load determination unit determining load data, a memory for storing a driveforce map, and a processor connected to the load determination unit and the memory, the processor configured to analyze the load data and adjust the driveforce map based on the load data.

In another embodiment, the present invention is an automobile including a load determination unit for determining load data, an acceleration input device for detecting acceleration input data, a driveforce unit for generating an output, a memory for storing a driveforce map including a driveforce curve indicating the output of the driveforce unit for a corresponding acceleration input data, and a processor connected to the load determination unit and the memory, the processor configured to analyze the load data, adjust the driveforce map based on the load data, and vary the output of the driveforce unit according to the driveforce map.

In yet another embodiment, the present invention is a method for varying an output of a driveforce unit in an automobile including determining load data for the automobile, analyzing the load data, storing a driveforce map, adjusting the driveforce map based on the load data; and varying the output of the driveforce unit according to the driveforce map.

BRIEF DESCRIPTION OF THE DRAWINGS

The features and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
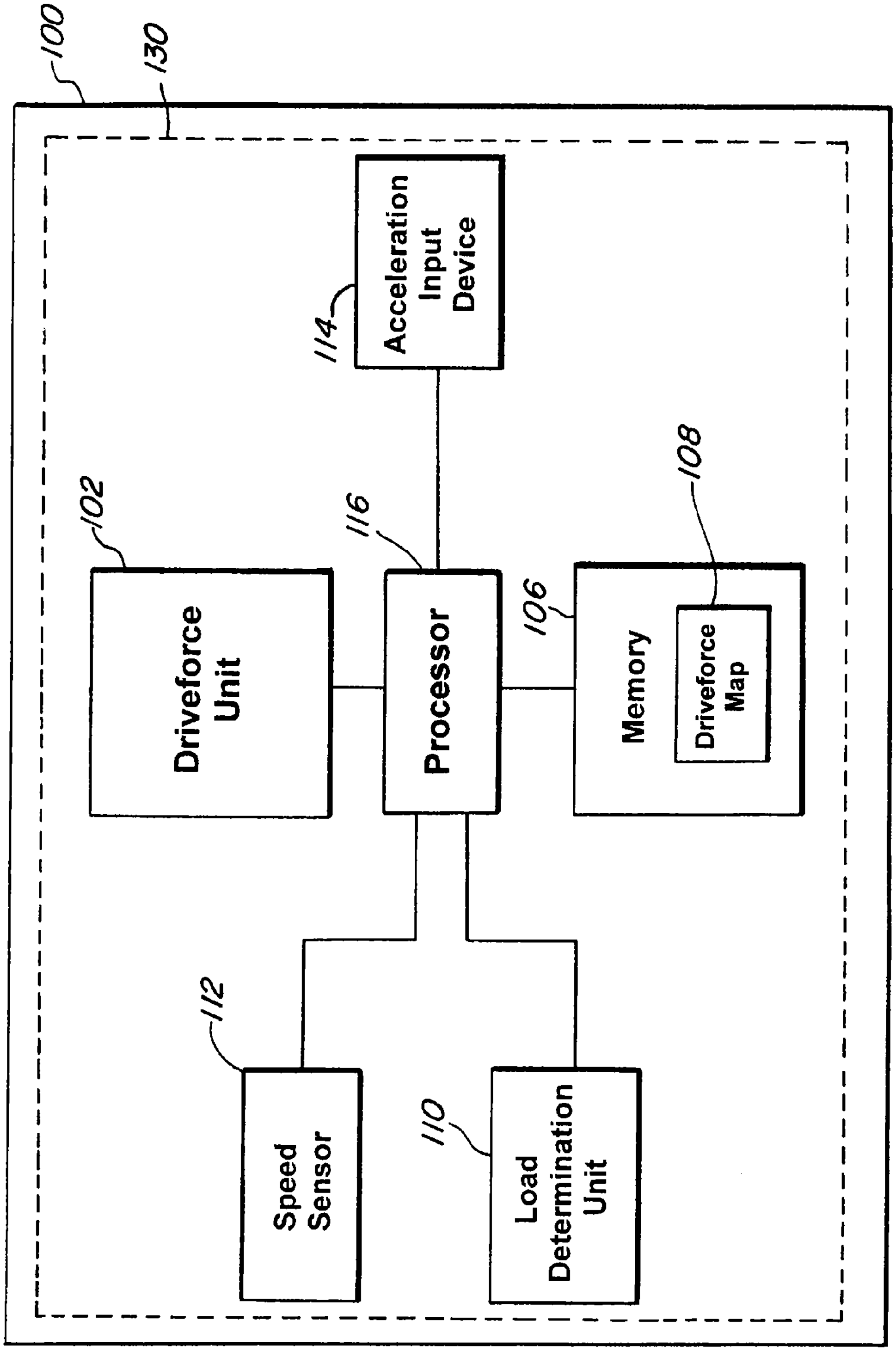
FIG. 1 is a schematic diagram of an automobile including a driveforce system according to an embodiment of the present invention.

In one embodiment, the present invention includes an automobile 100 as shown in FIG. 1. The automobile 100 includes a driveforce system 130. The driveforce system 130 can include, for example, a driveforce unit 102, a memory 106, a load determination unit 110, a speed sensor 112, and/or an acceleration input device 114.

The driveforce unit 102 is connected to the processor 116. The driveforce unit 102 includes, for example, a throttle having a variable throttle opening. The driveforce unit 102 can generate an output which can be varied according to instructions from the processor 116. Thus, the output of the driveforce unit 102 can increase or decrease by a varying amount depending on the instructions received by the driveforce unit 102. By varying the output of the driveforce unit 102, the amount of torque generated can be controlled. By controlling the amount of torque generated, the speed of the automobile 100 can be controlled. Thus, by varying the output of the driveforce unit 102, the speed of the automobile 100 can be maintained, increased, or decreased.

The acceleration input device 114 is connected to the processor 116. The acceleration input device 114 can be, for example, an acceleration pedal. The acceleration input device 114 receives acceleration input data. The acceleration input data can be, for example, a percent application of the acceleration input device 114. The application of the acceleration input device 114 can signify, for example, a desire to maintain speed in the automobile, increase speed in the automobile, or decrease speed in the automobile.

Figure 2:
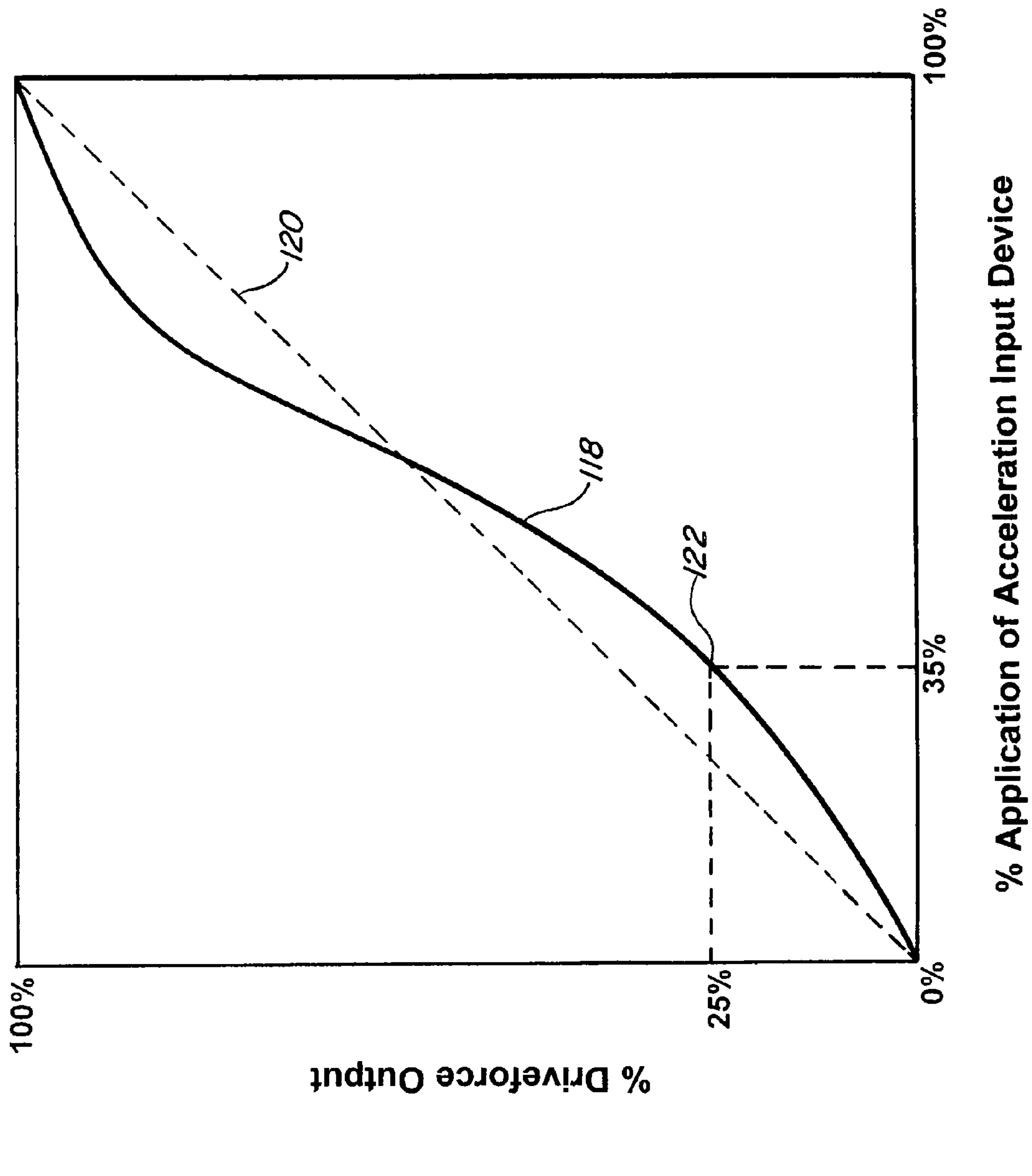
FIG. 2 depicts a driveforce map according to an embodiment of the present invention.

The memory 106 is connected to the processor 116. The memory 106 includes, for example, a driveforce map 108. The driveforce map 108 can indicate a relationship between a percentage application of the acceleration input device 114 and the output of the driveforce unit 102. For example, the driveforce map 108 is shown in FIG. 2. In FIG. 2, line 120 is a reference line indicating a 1:1 relationship between the percent application of the acceleration input device 114 and the percent output of the driveforce unit 102. A driveforce curve 118 indicates the relationship between the percent application of the acceleration input device 114 and the percent output of the driveforce unit 102 in the driveforce map 108. As seen in FIG. 2, a 35% application of the acceleration input device results in a 25% output of the driveforce unit. However, as will be shown later, the driveforce curve 118 can be dynamically manipulated and/or adjusted.

The load determination unit 110 is connected to the processor 116. The load determination unit 110 determines the load data. The load data can indicate, for example, a load on the automobile 100, such as when the automobile 100 is on an incline, or a grade. The load data can also indicate, for example, any added mass on the automobile 100, such as when the automobile 100 is towing an object, and/or has an increased payload. The load determination unit 110 can determine, for example, the load data from various inputs regarding the automobile 100 such as the speed of the automobile 100, the acceleration of the automobile 100, the braking deceleration of the automobile 100, the suspension system data of the automobile 100, and/or the weight of the automobile 100.

The speed sensor 112 is connected to the processor 116 and provides speed data to the processor 116. The speed data can indicate, for example, a speed of the automobile 100, and/or an acceleration of the automobile 100.

The processor 116 is connected to the driveforce unit 102, the memory 106, the load determination unit 110, the speed sensor 112, and/or the acceleration input device 114. The processor 116 can, for example, receive the acceleration input data from the acceleration input device 114, the load data from the load determination unit 110, and/or the speed data from the speed sensor 112. Based on the acceleration input data, the load data, and/or the speed data, the processor 116 can adjust the driveforce map 108 by adjusting the driveforce curve 118.

Figure 3:
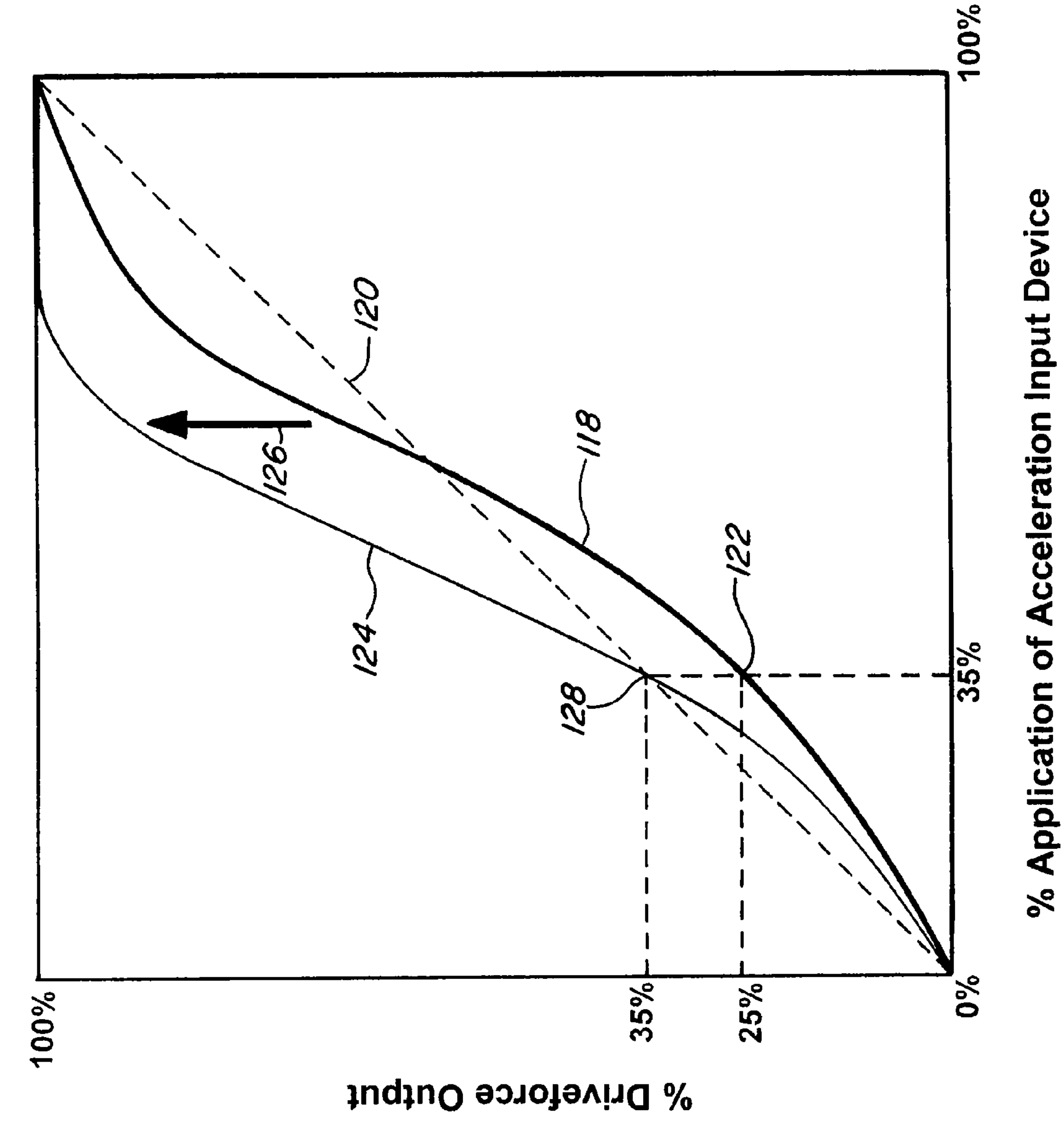
FIG. 3 depicts an adjustment of a driveforce map according to an embodiment of the present invention.

For example, the driveforce curve 118 can be adjusted as shown in FIG. 3. In FIG. 3, the line 126 indicates, for example, an adjustment of the driveforce curve 118 to be the driveforce curve 124. The driveforce curve 118 is increased to be the driveforce curve 124. The driveforce curve 118 can be changed to the driveforce curve 124, for example, when the load data indicates an increased load.

Thus, where a 35% application of the acceleration input device 114 results in a 25% output in the driveforce unit 102 according to the driveforce curve 118 as indicated by point 122, a 35% application of the acceleration input device 114 results in a 35% output in the driveforce unit 102 as indicated by point 128. This increase in output of the driveforce unit 102 allows the automobile 100 to maintain its speed even when it is saddled with an increased load, such as when the automobile 100 is traveling through or up an increased grade. Thus, the user of the automobile 100 does not need to increase the percent application of the acceleration input device 114 in order to maintain the speed of the automobile 100, resulting in a much more comfortable driving experience for the user.

To determine the increase in the driveforce curve 118, an adjustment calculation can be performed by the processor 116 to determine the output of the driveforce unit 102 when the load data indicates an increased load in order to maintain the gear ratio, the speed, and the acceleration for a particular percent application of the acceleration input device 114.

For example, with a normal load, such as with a 0% grade, 6th gear, 60 mph speed, 0 acceleration (steady speed), and 35% application of the acceleration input device 114, the output of the driveforce unit 102 should be at 25% as indicated by the point 122 in the driveforce curve 118. However, with an increased load, such as with a 2% grade, the output of the driveforce unit 102 should be at 35% as indicated by the point 128 in the driveforce curve 118 to maintain the 6th gear, 60 mph speed, 0 acceleration (steady speed) and 35% application of the acceleration input device 114. Thus, the output of the driveforce unit 102 changes based on the load data in order to maintain the gear ratio, the speed of the automobile 100, the acceleration of the automobile 100, and the percent application of the acceleration pedal.

Generally, the speed of the automobile 100 will decrease without increasing the output of the driveforce 102 when there is an increased load. However, a conventional automobile does not increase the output of the driveforce 102 when the percent application of the acceleration input device remains stagnant, even when there is an increased load. Thus, the conventional automobile will decrease in speed with an increased load unless the user increases the percent application of the acceleration input device 114.

However, in the automobile 100 of the present invention, the output of the driveforce unit 102 is increased when there is an increased load so that the user does not need to further increase the percent application of the acceleration input device 114. Therefore, the automobile 100 can maintain a constant speed without an increase in the percent application of the acceleration input device 114, even when there is an increased load.

The same principles described above can also be applied when the load is, for example, decreased. In such a case, the driveforce curve 118 can be decreased so that the same percent application of the acceleration input device 114 results in a decreased output of the driveforce unit 102. This is beneficial, for example, if the automobile 100 is going downhill. In conventional automobiles, the automobile 100 will accelerate quickly when going downhill.

However, with the driveforce system 130 of the present invention, the output of the driveforce unit 102 is reduced, allowing the speed of the automobile 100 to remain substantially constant or increase at a slower rate. This can reduce a necessity of the user to decrease the percent application of the acceleration input device 114.

Although FIG. 3 depicts the entire driveforce curve 118 being increased, only a portion of the driveforce curve 118 can be changed. Also, a portion of the driveforce curve 118 can be increased, while a portion of the driveforce curve 118 can be decreased. In addition, the driveforce curve 118 can be infinitely dynamically adjusted such that the driveforce unit 102 can generate any desired output. In one embodiment, the driveforce curve 118 can be increased only when the load data indicates a load above a first predetermined load threshold. In another embodiment, the driveforce curve can be decreased only when the load data indicates a load below a second predetermined load threshold. This can be beneficial to ignore small variances in the load on the automobile to reduce the amount of changes in the driveforce curve and subsequently the output of the driveforce unit 102.

Figure 4:
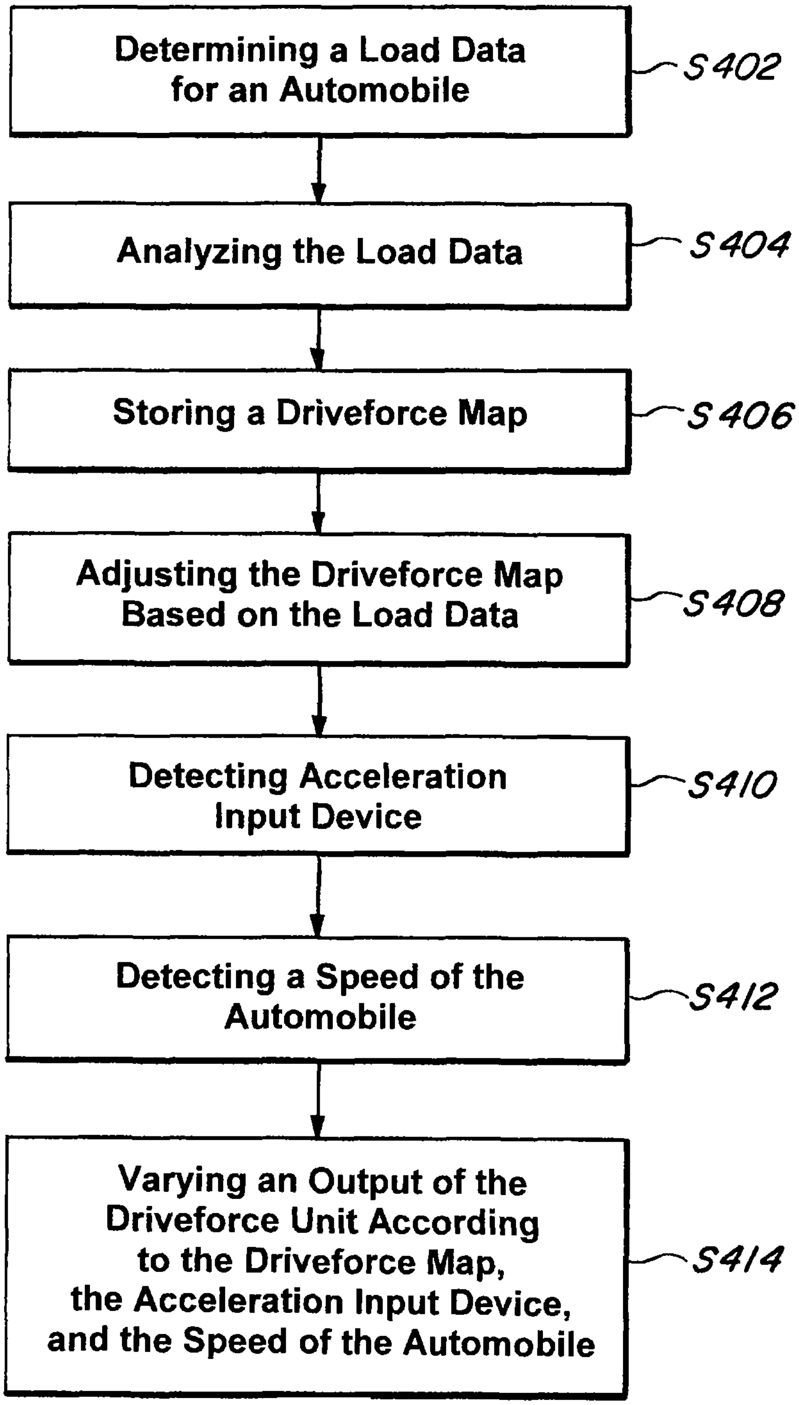
FIG. 4 is a process according to an embodiment of the present invention.

In one embodiment, the present invention is a process as shown in FIG. 4. In Step S402, a load data is determined for an automobile. For example, the load determination unit can determine load data for the automobile 100. In Step S404, the load data can be analyzed. For example, the processor 116 can analyze the load data to determine whether there is an increased or decreased load on the automobile 100.

In Step S406, a driveforce map is stored. For example, the driveforce map 108 can be stored in the memory 106. In Step S410, an acceleration input data is detected. For example, the acceleration input data can be detected by the acceleration input device 114. In Step S412, a speed of the automobile can be detected. For example, the speed sensor 112 can detect a speed of the automobile 100. In Step S414, an output of the driveforce unit is varied according to the driveforce map, the acceleration input data, and the speed of the automobile. For example, the output of the driveforce unit 102 is varied according to the driveforce map 108, the acceleration input data, and the speed of the automobile 100.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A driveforce system of an automobile, the driveforce system comprising:

an acceleration input device configured to detect acceleration input data;

a load determination unit configured to determine load data;

a memory configured to store driveforce data corresponding to a driveforce curve that indicates a driveforce output for a corresponding acceleration input;

a driveforce unit configured to generate driveforce outputs based on the driveforce curve; and a processor connected to the acceleration input device, the driveforce unit, the load determination unit and the memory, the processor configured to adjust the driveforce curve based on the load data such that a speed of the automobile for a given acceleration input is substantially maintained when the load data indicates an increased load.

2. The system of claim 1 wherein:

the processor is further configured to calculate an updated driveforce output for the given acceleration input when the load data indicates the increased load, and the driveforce unit is further configured to generate the updated driveforce output such that the speed of the automobile is substantially maintained for the given acceleration input.

3. The system of claim 1 wherein the processor adjusts the driveforce data by up-shifting the driveforce curve.

4. The system of claim 1 wherein the processor adjusts the driveforce data by down-shifting the driveforce curve.

5. The system of claim 1 further comprising a speed sensor connected to the processor and configured to detect the speed of the automobile.

6. The system of claim 1 wherein the speed of the automobile is maintained when the acceleration input data remains substantially the same.

7. The system of claim 1 wherein the speed of the automobile is increased when the acceleration input data indicates an increase in application of an acceleration pedal.

8. The system of claim 1 wherein the processor receives the acceleration input data and the processor varies the driveforce output of the driveforce unit according to the driveforce curve.

9. An automobile comprising:

a load determination unit configured to determine load data;

an acceleration input device configured to detect acceleration input data;

a memory configured to store driveforce data corresponding to a driveforce curve that indicates a driveforce output of the driveforce unit for a corresponding acceleration input;

a driveforce unit configured to generate driveforce outputs based on the driveforce curve; and a processor connected to the load determination unit and the memory, the processor configured to:

calculate an updated driveforce output when the load data indicates an increased load such that a speed of the automobile is substantially maintained for the acceleration input, and adjust the driveforce curve based on the load data, and vary the driveforce output of the driveforce unit according to the driveforce curve.

10. The automobile of claim 9 wherein the processor adjusts the driveforce data by up-shifting the driveforce curve when the load data indicates a load above a first predetermined load threshold, and the processor adjusts the driveforce data by down-shifting the driveforce curve when the load data indicates a load below a second predetermined load threshold.

11. The automobile of claim 9 further comprising a speed sensor connected to the processor and configured to detect the speed of the automobile, wherein the processor adjusts the driveforce map by up-shifting the driveforce curve to substantially maintain the speed of the automobile when the load data indicates the increased load.

12. The automobile of claim 11 wherein the speed of the automobile is substantially maintained when the acceleration input data remains substantially the same, and wherein the speed of the automobile is increased when the acceleration input data indicates an increase in application of an acceleration pedal.

13. The automobile of claim 9 wherein the processor receives the acceleration input data and the processor varies the driveforce output of the driveforce unit according to the driveforce curve.

14. A method for varying an output of a driveforce unit in an automobile, the method comprising:

detecting, using an acceleration input device acceleration input data;

determining, using a load determination unit, load data for the automobile;

storing, using a memory, driveforce data corresponding to a driveforce curve that indicates a driveforce output for a corresponding acceleration input;

generating, using a driveforce unit, driveforce outputs based on the driveforce curve; and adjusting, using a processor, the driveforce curve based on the load data such that a speed of the automobile for a give acceleration input is substantially maintained when the load data indicates an increased load.

15. The method of claim 14 further comprising:

calculating, using the processor, an updated driveforce output for the given acceleration input when the load data indicates the increased load; and generating, using the driveforce unit, the updated driveforce output such that the speed of the automobile is substantially maintained for the given acceleration input.

16. The method of claim 14 further comprising:

adjusting the driveforce map by up-shifting the driveforce curve when the load data indicates a load above a first predetermined load threshold; and adjusting the driveforce map by down-shifting the driveforce curve when the load data indicates a load below a second predetermined load threshold.

17. The system of claim 14 further comprising:

detecting, using a speed sensor, the speed of the automobile; and adjusting, using the processor, the driveforce data by up-shifting the driveforce curve to substantially maintain the speed of the automobile when the load data indicates the increased load.

18. The system of claim 17 further comprising substantially maintaining, using the processor, the speed of the automobile when the acceleration input data remains substantially the same.

19. The system of claim 17 further comprising increasing the speed of the automobile when the acceleration input data indicates an increase in application of an acceleration.

* * * * *